US009942035B2

(12) United States Patent
Rozas et al.

(10) Patent No.: US 9,942,035 B2
(45) Date of Patent: Apr. 10, 2018

(54) PLATFORM MIGRATION OF SECURE ENCLAVES

(71) Applicant: INTEL CORPORATION, Santa Clara, CA (US)

(72) Inventors: Carlos V. Rozas, Portland, OR (US); Mona Vij, Hillsboro, OR (US); Rebekah M. Leslie-Hurd, Portland, OR (US); Krystof C. Zmudzinski, Forest Grove, OR (US); Somnath Chakrabarti, Bangalore (IN); Francis X. McKeen, Portland, OR (US); Vincent R. Scarlata, Beaverton, OR (US); Simon P. Johnson, Beaverton, OR (US); Ilya Alexandrovich, Haifa (IL)

(73) Assignee: Intel Corporation, Santa Clara, CA (US)

( * ) Notice: Subject to any disclaimer, the term of this patent is extended or adjusted under 35 U.S.C. 154(b) by 183 days.

(21) Appl. No.: 14/829,340

(22) Filed: Aug. 18, 2015

(65) Prior Publication Data
US 2017/0054557 A1    Feb. 23, 2017

(51) Int. Cl.
*H04L 9/08* (2006.01)
*G06F 9/455* (2018.01)
(Continued)

(52) U.S. Cl.
CPC ........ *H04L 9/0891* (2013.01); *G06F 9/45558* (2013.01); *H04L 63/061* (2013.01);
(Continued)

(58) Field of Classification Search
CPC .................................................... H04L 9/0891
(Continued)

(56) References Cited

U.S. PATENT DOCUMENTS

| 8,972,746 B2 * | 3/2015 | Johnson .............. G06F 21/6218 713/189 |
| 2006/0184561 A1 | 8/2006 | Terada |

(Continued)

OTHER PUBLICATIONS

Baumann, Andrew, et al., "Shielding Applications from an Untrusted Cloud with Haven", Oct. 2014, 18 pages.
(Continued)

*Primary Examiner* — Jacob Lipman
(74) *Attorney, Agent, or Firm* — Lowenstein Sandler LLP

(57) ABSTRACT

A processor to support platform migration of secure enclaves is disclosed. In one embodiment, the processor includes a memory controller unit to access secure enclaves and a processor core coupled to the memory controller unit. The processor core to identify a control structure associated with a secure enclave. The control structure comprises a plurality of data slots and keys associated with a first platform comprising the memory controller unit and the processor core. A version of data from the secure enclave is associated with the plurality of data slots. Migratable keys are generated as a replacement for the keys associated with the control structure. The migratable keys control access to the secure enclave. Thereafter, the control structure is migrated to a second platform to enable access to the secure enclave on the second platform.

20 Claims, 13 Drawing Sheets

(51) Int. Cl.
*H04L 29/08* (2006.01)
*H04L 29/06* (2006.01)

(52) U.S. Cl.
CPC .............. *H04L 63/10* (2013.01); *H04L 67/34* (2013.01); *G06F 2009/45575* (2013.01); *G06F 2009/45587* (2013.01)

(58) Field of Classification Search
USPC .......................................................... 380/44
See application file for complete search history.

(56) References Cited

U.S. PATENT DOCUMENTS

| | | |
|---|---|---|
| 2008/0072287 A1* | 3/2008 | Movva ................. H04W 12/10 726/2 |
| 2011/0231865 A1 | 9/2011 | Dorn et al. |
| 2013/0198853 A1 | 8/2013 | McKeen et al. |
| 2013/0232344 A1 | 9/2013 | Johnson et al. |
| 2013/0312117 A1 | 11/2013 | Sapp, II et al. |

OTHER PUBLICATIONS

Intel Presentation, "SGX Migration F2F", Mar. 14, 2015, 120 pages.
International Search Report for PCT Patent Application No. PCT/US2016/046062 dated Nov. 30, 2016, 14 pages.

\* cited by examiner

US 9,942,035 B2

PLATFORM MIGRATION OF SECURE ENCLAVES

TECHNICAL FIELD

The embodiments of the disclosure relate generally to computer systems, and more specifically, but without limitation, to platform migration of secure enclaves.

BACKGROUND

Modern processors are designed to protect sensitive data in memory from both hardware and software attacks. Some processors provide strategies that can reserve a portion of memory and enforce cryptographic protections on this portion of memory. The portion of memory may include a plurality of secure memory pages that are accessible on a secure platform.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
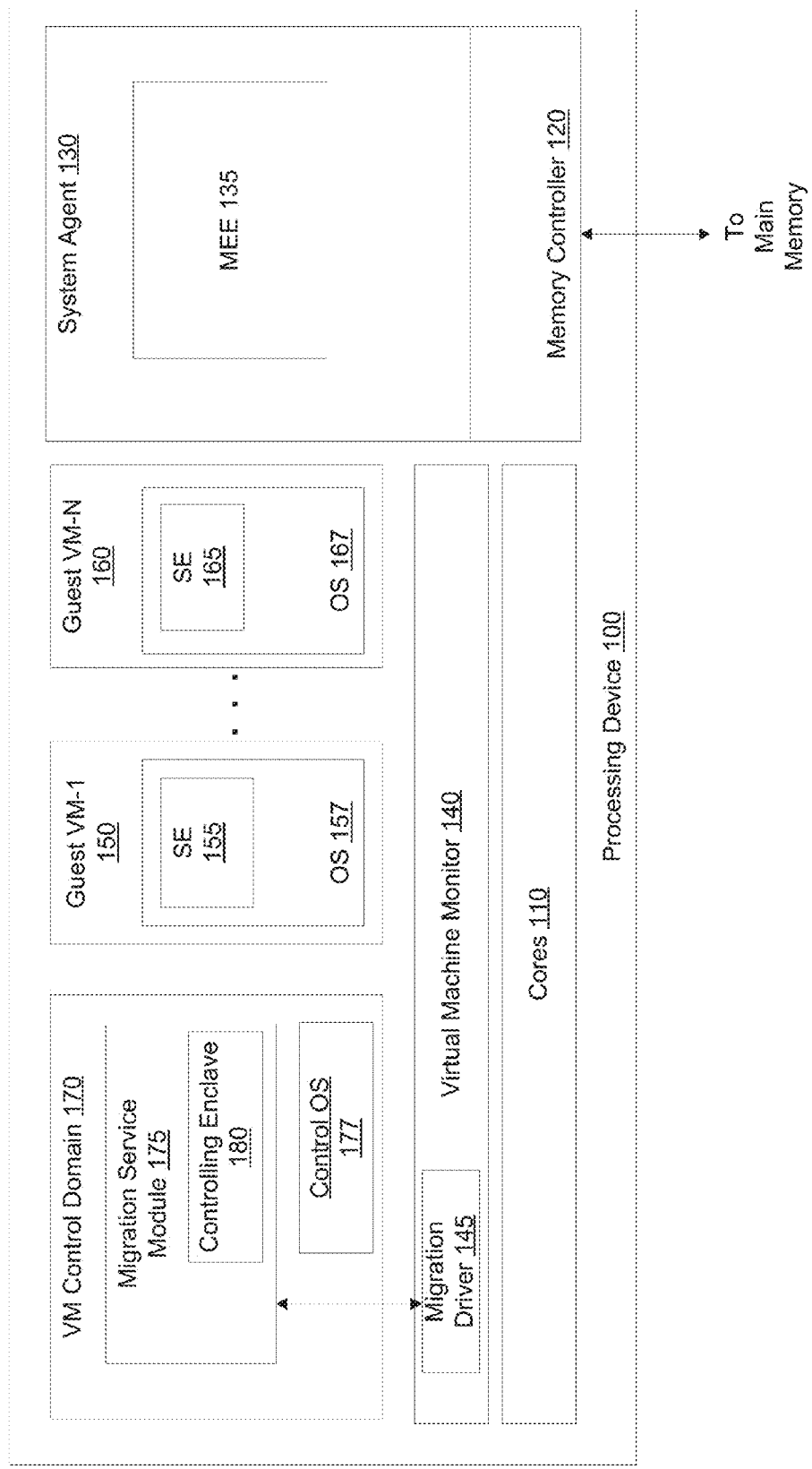
FIG. 1 illustrates a block diagram of a processing device according to one embodiment.

Embodiments of the disclosure implement techniques for platform migration of Secure Enclaves (SEs). In one embodiment, a processing device, such as a processor, may comprise processing logic configured to implement a trusted execution environment represented by the SEs. The processing device may execute instructions residing in protected memory and access data residing in this protected memory, while preventing unauthorized access to the protected memory. Access to memory pages associated with the SEs from applications not resident in the SEs is prevented even if such access is attempted by a privileged application such as BIOS, operating systems or virtual machine monitors. An active secure enclave may be divided into an encrypted portion and a decrypted portion. The encrypted portion may reside in an unprotected memory (such as main memory or disk). The decrypted portion resides in an enclave page cache (EPC) associated with the SE. The EPC is a protected memory used by the processing device to temporarily store SE memory pages.

The processing device may implement several mechanisms for protecting access to the EPC. In one embodiment, a protection mechanism for the EPC may be implemented by a memory encryption engine (MEE) associated with the processing device. The MEE uses cryptographic mechanisms including an encryption key to encrypt data and other techniques to provide integrity and confidentiality when the EPC is stored in an untrusted external memory (e.g. DRAM). When EPC memory is read from DRAM, it is decrypted and integrity checked and then placed into an internal cache of the processing device. At this point, an access control mechanism associated with the processing device may take over. For example, the access control mechanism may be implemented using page miss handlers in processor cores of the processing device as well as a system agent. In some embodiments, the system agent may reside in an uncore of the processing device. The uncore may include functions of the processing device that are not in the core, but are need for core performance. In some embodiments, the SEs may include a set of instructions that allows for the secure copying of a memory page inside of the EPC to regular memory. These instructions may use a combination of cryptography and access control mechanisms that include encryption keys, which are distinct from the encryption keys used in the MEE.

Previous implementations could not allow an SE to be migrated between two distinct platforms, because some encryption keys were persistent and bound to a specific hardware platform, such as sealing and attestation encryption keys. Other keys have specific lifetimes that are bound to a host system. For example, some systems provide for protecting paging spaces using per-page encryption keys with short lifetimes. However, migration of an SE to a new platform may be intended for various reasons. For example, a system administrator may aim to move an SE to a new platform to improve operational performance of the SE or when maintenance needs to be performed on the current platform.

In accordance with embodiments of the disclosure, techniques are provided to support mitigating an SE from one platform to another by 1) enabling encapsulation of an SE platform state (keys and other information) into a control structure contained in protected memory, 2) allowing multiple instantiations of the control structure with a different platform state (e.g., different keys), and 3) providing a migration service that manages the life cycle of the control structure, which can include transferring the control structure between platforms in a trusted fashion.

In one embodiment, an SE can be executed on a first platform, referred to as platform A, and bound to a control structure that is initialized by the migration service. The SE can include secrets (e.g., secure memory pages) and can seal these secrets. For example, the secrets can be sealed using protection techniques that utilize a combination of SE attributes and platform unique keys to generate encryption keys. The control structure may include migratable keys that are generated to control access to the SE. To migrate the control structure, the migration service may execute a set of instructions that enable the allocation, initialization and control of the control structure on a second platform, referred to as platform B. In some embodiments, the second platform may be on the same or different physical machine as platform A. To store the encrypted secrets in the control structure, the migration service may evict memory pages associated with the SE from system memory. Then, the migration service may copy version data of the evicted memory pages to a memory location associated with the control structure. In one embodiment, the control structure may be sealed. In some embodiments, the SE associated with the control structure may be shut down on platform A, thus sealing of the control structure in this case may not necessary.

Thereafter, the migration service may migrate or otherwise copy contents and secrets of the SE from platform A to platform B. For example, the migration service can securely copy the control structure associated with the SE to platform B. To securely copy the control structure, contents of the control structure may be protected using protection techniques (e.g., encryption and authentication) before being copied. In some embodiments, the migration service may securely transfer non-volatile contents of the SE (e.g., migratable keys used to support the protection techniques) in the control structure to a second migration service on platform B. On platform B, the SE can be generated and initialized by the second migration service using the transferred contents of the control structure. This may allow the SE to gain access to secrets previously sealed when the SE is re-stared on platform B.

FIG. 1 is a block diagram illustrating a processing device 100, which may support platform migration of SEs according to one embodiment. The processing device 100 may be generally referred to as "processor" or "CPU". "Processor" or "CPU" herein shall refer to a device capable of executing instructions encoding arithmetic, logical, or I/O operations. In one illustrative example, a processor may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

As shown in FIG. 1, processing device 100 may include various components. In one embodiment, processing device 100 may include one or more processors cores 110, among other components, coupled to each other as shown. The processing device 100 may also include a communication component (not shown) that may be used for point-to-point communication between various components of the processing device 100. The processing device 100 may be used in a computing system (not shown) that includes, but is not limited to, a desktop computer, a tablet computer, a laptop computer, a netbook, a notebook computer, a personal digital assistant (PDA), a server, a workstation, a cellular telephone, a mobile computing device, a smart phone, an Internet appliance or any other type of computing device. In another embodiment, the processing device 100 may be used in a system on a chip (SoC) system.

The processor core(s) 110 may execute instructions of the processing device 100. The processor cores 110 include, but are not limited to, pre-fetch logic to fetch instructions, decode logic to decode the instructions, execution logic to execute instructions and the like. The processor cores 110 include a cache (not shown) to cache instructions and/or data. The cache includes, but is not limited to, a level one, level two, and a last level cache (LLC), or any other configuration of the cache memory within the processing device 100. The processor core 110 may be used with a computing system on a single integrated circuit (IC) chip of a computing system. One embodiment of a computing system on a chip may comprise a processor and a memory. The memory for one such system is a flash memory. The flash memory can be located on the same die as the processor and other system components. Additionally, other logic blocks such as a memory controller or graphics controller can also be located on a system on a chip. The instructions may include, but are not limited to, pre-fetch logic to fetch instructions, decode logic to decode the instructions, execution logic to execute instructions and the like. The computing system may be representative of processing systems based on the Pentium® family of processors and/or microprocessors available from Intel® Corporation of Santa Clara, Calif., although other systems (including computing devices having other microprocessors, engineering workstations, set-top boxes and the like) may also be used. In one embodiment, a sample computing system may execute a version of an operating system, embedded software, and/or graphical user interfaces. Thus, embodiments of the disclosure are not limited to any specific combination of hardware circuitry and software.

Memory controller 120 may perform functions that enable the processing device 100 to access and communicate with main memory (not shown) that includes a volatile memory and/or a non-volatile memory. In one embodiment, the memory controller 120 may be coupled to a system agent 130 that may include, among other things, a memory encryption engine (MEE) 135. In some embodiments, the MEE 135 may be located on a processor die associated with processing device 100, while the main memory is located off the processor die. In one embodiment, the MEE 135 may generate an encryption key used to perform encryption/decryption of any cache line that gets evicted out of the processing device 100 if it belongs to an SE. In another embodiment, the encryption key may be programmed into the MEE 135, for example, by either ucode or trusted firmware. In some embodiments, the key itself may be generated by a digital random number generator located in the processing device 100. In addition to the encryption key, there may also be a processor fuse key that is used by certain processor instructions to support SE data protection and attestation.

In one embodiment, the processing device 100 may include a virtual machine monitor (VMM) 140. VMM 140 may also be referred to as a hypervisor. The VMM 140 may abstract a physical layer of a hardware platform of a host computer system that may include processing device 100, and present this abstraction to a set of guest virtual machines (guest VMs) 150, 160. The VMM 140 provides a virtual operating platform for the guest VMs 150, 160 and manages the execution of the guest VMs 150, 160. In some embodiments, more than one VMM may be provided to support the guest VMs 150, 160 of the processing device 100.

In one embodiment, VMM 140 may manage a plurality of guest VMs, such a guest VM-1 150 through guest VM-N 160, as well as a VM control domain 170, which may all simultaneously run on the processing device 100. Each VM 150, 160 may be a software implementation of a machine that executes programs as though it was an actual physical machine. The programs may include an operating system (OS), such as OS 157 and OS 167, and other types of software and/or applications. In one embodiment, guest VM-1 150 through guest VM-N 160 may include secure enclaves, such as SE 155 and SE 165, respectively. The SEs 155, 165 provide a secure place for an application of the VMs 150, 160 to execute code and store data inside the context of an OS process. SE 155, 165 are executed based on memory pages in an EPC section of main memory.

In one or more embodiments, the VMM 140 may include a VM control domain 170 upon activation. In one embodiment, the VM control domain 170 may be separate from the VMM 140. In another embodiment, the VM control domain 170 may be part of a host OS, such as a kernel-based virtual machine, of the processing device 100. In which case, the migration service described below may execute on the host OS. In some embodiments, the VM control domain 170 may include its own operating system and a control OS 177, among other software and applications. The VM control domain 170 may be a software implementation that can communicate with each of the guest VM-1 150 through guest VM-N 160 using VMM 140. For example, the VM control domain 170 can use a control interface (not shown) of the VMM 140 to issue instructions to start, end, and suspend any one of the guest VMs 150, 160. The VM control domain 170 can issue instructions for the guest VMs 150, 160 individually or as a group. For example, the VM control domain 170 can issue a suspend command to guest VM-1 150 that is only set there, while VMM 140 and the other VMs operate normally.

In accordance with embodiments of the disclosure, the VM control domain 170 can support migration of a VM containing an SE, such as SE 155, from one hardware platform to another. For example, the VM control domain 170 may include a migration service module 175 that can manage the life cycle of a SE including transferring the SE between two platforms in a trusted manner. In one embodiment, the VM control domain 170 is configured to interact with VMM 140 for migrating SE 155 to a different platform. In particular, the VM control domain 170 is configured to receive requests to move SE 155 to a new platform and forward this request to a migration driver 145 of VMM 140. In one or more embodiments, the migration driver 145 includes functionality to interact directly with the guest VMs 150, 160 and underlying platform resources such as main memory.

In one embodiment, the migration service module 175 may include a type of enclave, such as a controlling enclave 180 or migration enclave (MigE). The controlling enclave 180 may be used to facilitate migration of a VM containing a SE from one platform to another. In some embodiments, the controlling enclave 180 may be associated with a control structure (not shown). The control structure contains state information related to the SE 155 to allow for the migration of the corresponding guest VM-1 150. This state information includes a set of encryption keys associated the SE 155 and other cryptographic-metadata that may be needed to support SGX instructions inside VM-1 150 on a given hardware platform. In some embodiments, the VMM 140 may create or allocate a specific control structure for each guest VM 150, 160 that it manages. This process of using the control structure to support platform migration of SEs is further discussed below with respect to FIG. 2.

Figure 2:
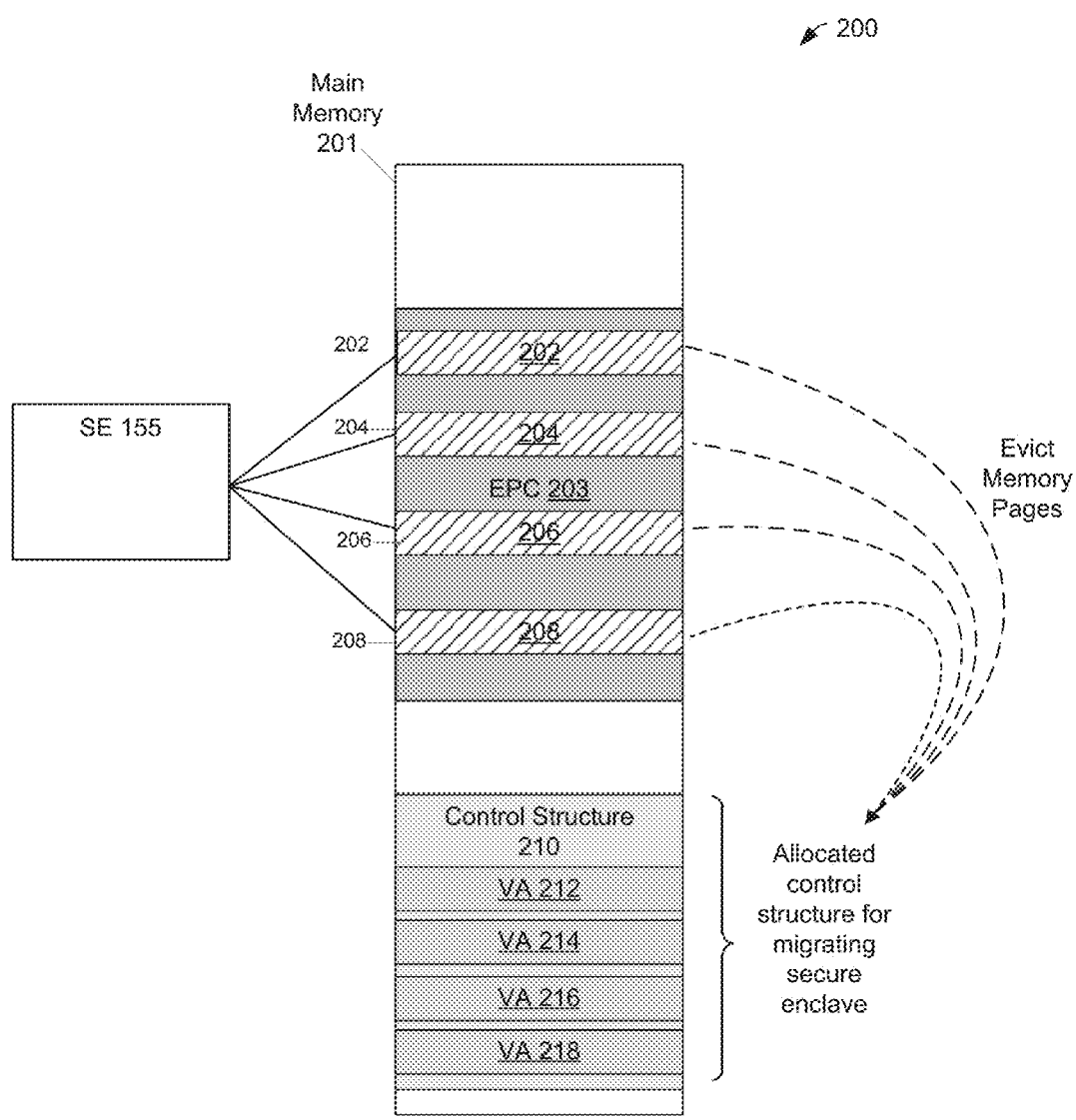
FIG. 2 illustrates a system for allocating a control structure to support platform migration of secure enclaves according to one embodiment.

FIG. 2 illustrates a system 200 for allocating a control structure 210 to support platform migration of SEs according to one embodiment. In this example, the system 200 includes main memory 201. The main memory 201 may include a plurality of secure memory ranges, such as the secure range that makes up EPC 203. Memory pages of the EPC 203 residing in main memory 201 are protected using encryption, integrity, and replay protections, for example, using the MEE 135 of processing device 100 described with respect to FIG. 1. In accordance with some embodiments, secure memory pages of an SE associated with EPC 203, such as secure pages 202, 204, 206 and 208 of SE 155, can be bound to control structure 210 and migrated to a remote platform.

When a new SGX structure is created, it is bound to a SGX domain control structure (SDCS) in memory 201, such as control structure 210, which uniquely identifies an enclave instance (e.g., controlling enclave 180). In one embodiment, the VMM 140 may then load a memory address associated with the control structure 210 into a register of one or more processors, such as processing device 100. In another embodiment, the VMM 140 may program the address of the control structure 210 into a virtual machine control structure (VMCS). If the control structure 210 is no longer needed, the VMM 140 may unload and remove the structure from all logical processors on the hardware platform of processing device 100 or the VMCS. For example, the control structure 180 may no longer be needed when SE 155 has been migrated to a new platform.

To migrate SE 155 to a new platform, one or more memory pages associated with the SE 155 may be evicted from main memory 201. An EPC page is evicted when the keys used to encrypt the page are retrieved from memory 201. In one embodiment, the migration service module 175 may notify system software (e.g., VMM 140) to allocate memory space for the control structure 210. For example, VMM 140 may allocate a SGX structure using a determined SGX instruction that when executed by the VMM 140 allocates a VA page containing an array of version slots. The allocated VA pages are for evicting pages associated with an enclave, such as SE 155. In some embodiments, the VMM 100 may then allocate some additional VA pages to evict a first set of VA pages. Thereafter, the eviction process may repeat until a single slot remains. This slot may be then moved to the SDCS.

In an alternative embodiment, the VMM can allocate a VA page and move a version in the SDCS to a VA slot in the newly allocated VA page using an instruction EDVASLOTLD. The VMM can then use the VA slot to load VA page that was evicted from the EPC to regular memory and whose version resides in the VA slot recently populated by EDVASLOTLD. It can then use VA slots in the new loaded page to load additional VA pages or SEs back into the EPC.

In some embodiment, the SGX instructions may also initialize the control structure 210. For example, the SGX instructions may initialize a plurality of version array (VA) slots, such as VA 212-218, in the allocated memory space. In certain situations, an allocated SDCS, such as control structure 210, can only be partially initialized. In such cases, the SDCS may be put into a pending state. To complete the initialization of the SDCS, controlling enclave 180 may execute an instruction also refer to as "EDINIT" to complete the initialization. The EDINIT instruction may take a pending SDCS and complete the initialization using data provided by the controlling enclave 180. In some embodiments, this data may include keys and version information.

The VA slots may be used to hold version data associated with memory pages 202-208 of the SE 155 that are evicted. For example, when an EPC page of the SE is evicted, certain information about each page is maintained in a corresponding VA slot of the control structure 210 used to evict the page. The version data may be used to prevent replay attacks as well as ensure that the most recent copy of the data is loaded at the destination. In another embodiment, an authentication tag instead of the version data may be stored. In some embodiments, other data related to the evicted pages may be stored in a separate structure. This separate structure may include, for example, an authentication tag that authenticates the encrypted contents of the page, meta-data and a version of the page. The separate structure may reside in a normal system memory location of main memory 201. After the version data is loaded into the control structure 210, an instruction to seal the control structure 210 may be executed.

Figure 3:
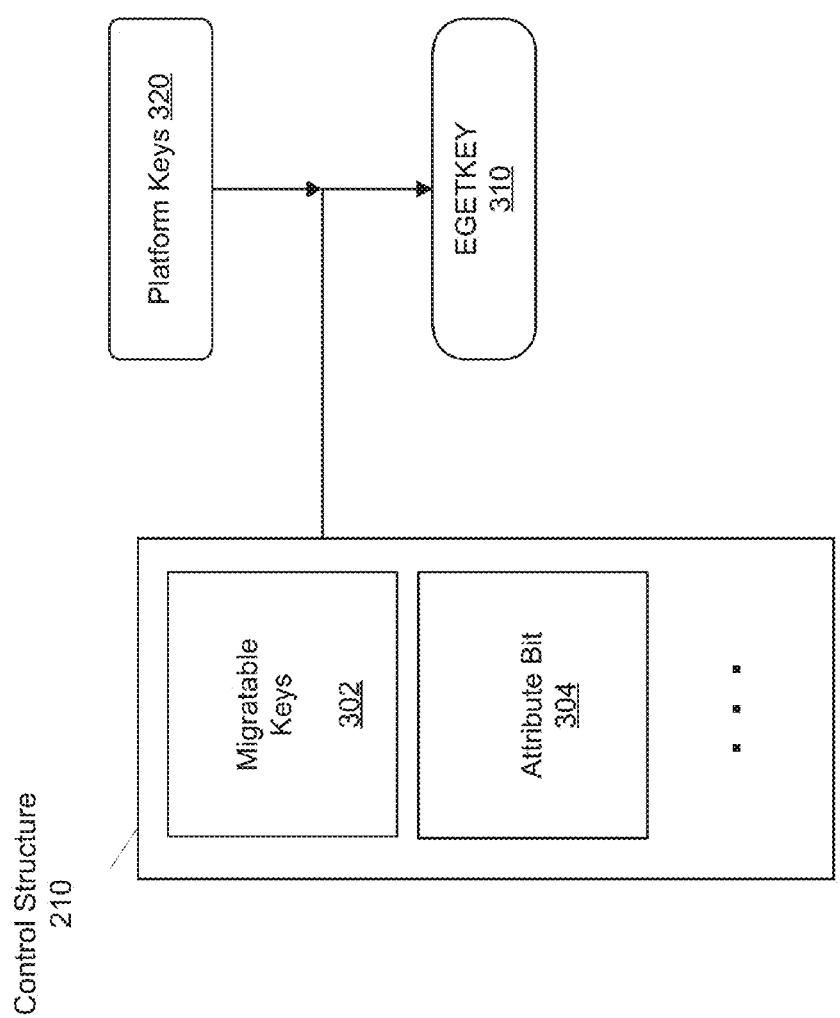
FIG. 3 illustrates a system for sealing a control structure according to one embodiment.

FIG. 3 illustrates a system 300 for sealing a control structure, such as control structure 210 of FIG. 2, according to one embodiment. In this example, the system 300 may include controlling enclave 180 that may be part of or included in migration service module 175 of FIG. 1. The control structure 210 when sealed may include a set of migratable keys 302 that enable access to SE 155 and set of instructions to facilitate the migration of the control structure as well as other information to a different platform. This other information may include, for example, security policy information of the VM of the SE associated with the control structure 210.

To access the control structure 210 (for example, reading or writing information thereto), the controlling enclave 180 may execute a particular instruction. The instruction may verify that the controlling enclave 180 is the control enclave of this structure. When the instruction is executed, the controlling enclave 180 may pass a control structure identifier that is compared to an identifier in the control structure. Then, the instruction may verify that any fields in the structure being requested are accessible by the controlling enclave 180.

As shown in FIG. 3, migratable keys 302 are stored in the control structure 210. To enable migration, the controlling enclave can generate the migratable keys 302 to be used as a replacement of platform keys 320 for migratable enclaves. In some embodiments, the SGX architecture provides an interface for requesting keys as well as uses the keys in many instructions. The keys may be either derived from the platform keys 320 or are generated by ucode or trusted firmware during boot time of the processing device 100.

In some embodiments, an enclave may use a modified EGETKEY instruction, such as EGETKEY 210. The modified EGETKEY instruction may use keys within the control structure rather than platform keys 320 to allow an enclave associated with the control structure to be migratable without modification. In some embodiments, platform keys 320 may be used an input parameter to the EGETKEY 210.

In one embodiment, the VM associated with SE 155 is shutdown, for example, based on a request by the controlling enclave 180 to VMM 140. In some embodiments, the control structure 210 is "quiesced" by the VMM 140 using an instruction and subsequently the controlling enclave 180 is notified so that the control structure 210 can be marked as terminated. When the control structure 210 is quiesced, the processor does not allow the control structure to be updated, for example, by existing SGX instructions. In one embodiment, the control structure 210 may include an attribute bit 304 to indicate whether the structure has been quiesced. VMM 140 sets the attribute bit 304 when the control structure 210 is quiesced and the controlling enclave 180 clears this bit 304, for example, after the control structure 210 is successfully migrated to a new platform.

Figure 4:
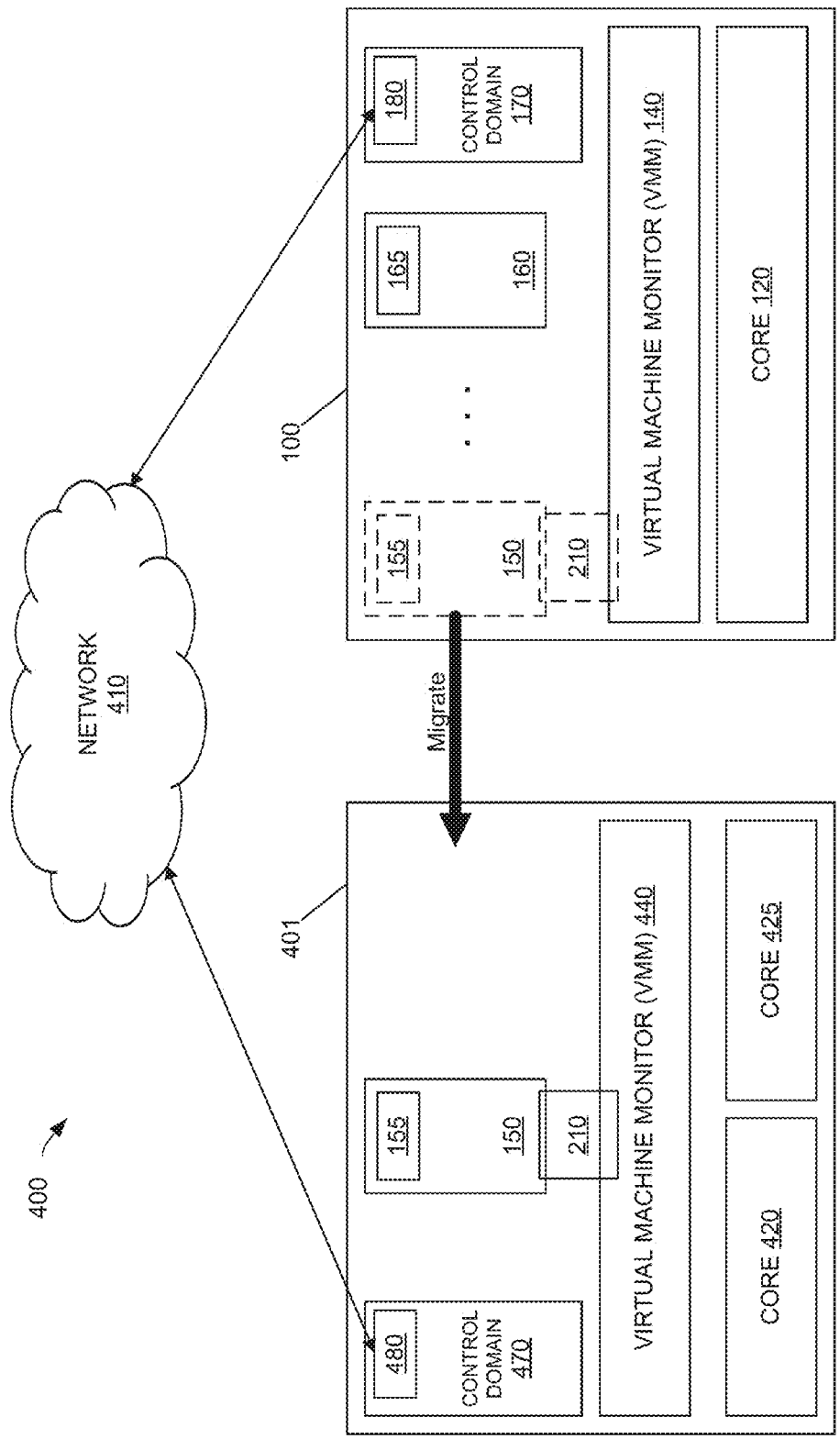
FIG. 4 illustrates a system for supporting platform migration of secure enclaves according to one embodiment.

FIG. 4 illustrates a system 400 for supporting platform migration of SEs according to one embodiment. In this example, the system 400 may include processing device 100 of FIG. 1 on a first hardware platform and a second processing device 401 on a second hardware platform that is accessible via network 410. The second processing device 401 may be comparable to processing device 100. For example, the second processing device 401 may include processor cores 420 and 425 (similar to processor cores 110), a VMM 440 (similar to VMM 140) that is executed by any one of the processor cores 420 and 425, and a control domain 470 that includes a controlling enclave 480 (similar to VM control domain 170 and controlling enclave 180). In accordance with some embodiments, the system 400 may be configured to migrate from a specific hardware platform to another a guest VM that includes a SE.

In one embodiment, the controlling enclave 180 is notified that a particular SE of a guest VM is to be migrated to processing device 401 on the second platform. In some embodiments, the second platform may be on a different or same physical machine as platform A. For example, processing device 401 may be on divided partition of the same physical host machine comprising processing device 100. The controlling enclave 180 may be notified to migrate a control structure 210 associated with SE 155 to controlling enclave 480. Initially, the controlling enclave 180 may validate this request. For example, the controlling enclave 180 may validate that the control structure 210 is not in use and sealed by checking an attribute bit of the structure 210. If the control structure 210 is in use, the controlling enclave 180 may cancel or defer migration of SE 155 until a later time. If the control structure 210 is not in use and sealed as discussed herein, the controlling enclave 180 may then securely transfer ownership of the structure 210 to the second controlling enclave 480. This may include moving the control structure 210 and accompanying secure data to processing device 401 on the second platform. In some embodiments, the control structure 210 may be transferred to the second controlling enclave 480, for example, by using a central authority, such as a trusted server coupled to network 410, or a peer-to-peer connection via network 410. In this regard, the controlling enclave 180 may be then an instruction to the central authority that causes it to send the control structure 210 to the second controlling enclave 480.

Once the control structure 210 and accompanying SE 155 and VM 150 data have been transferred, the control structure 210 can be re-built using the information on processing device 401. In this regard, VMM 440 of processing device 401 may request that control structure 210 be unsealed. For example, the second controlling enclave 480 may perform an authenticated decryption technique based on an encryption key (e.g., mirgatable keys 302) associated with the control structure 210. In some embodiments, the encryption key may be pre-shared or transferred to the second controlling enclave 480, for example, via a secure connection from the first controlling enclave 180. The VMM 400 may then resume the guest VM 150 that includes SE 155 on processing device 401 of the second platform.

Figure 5:
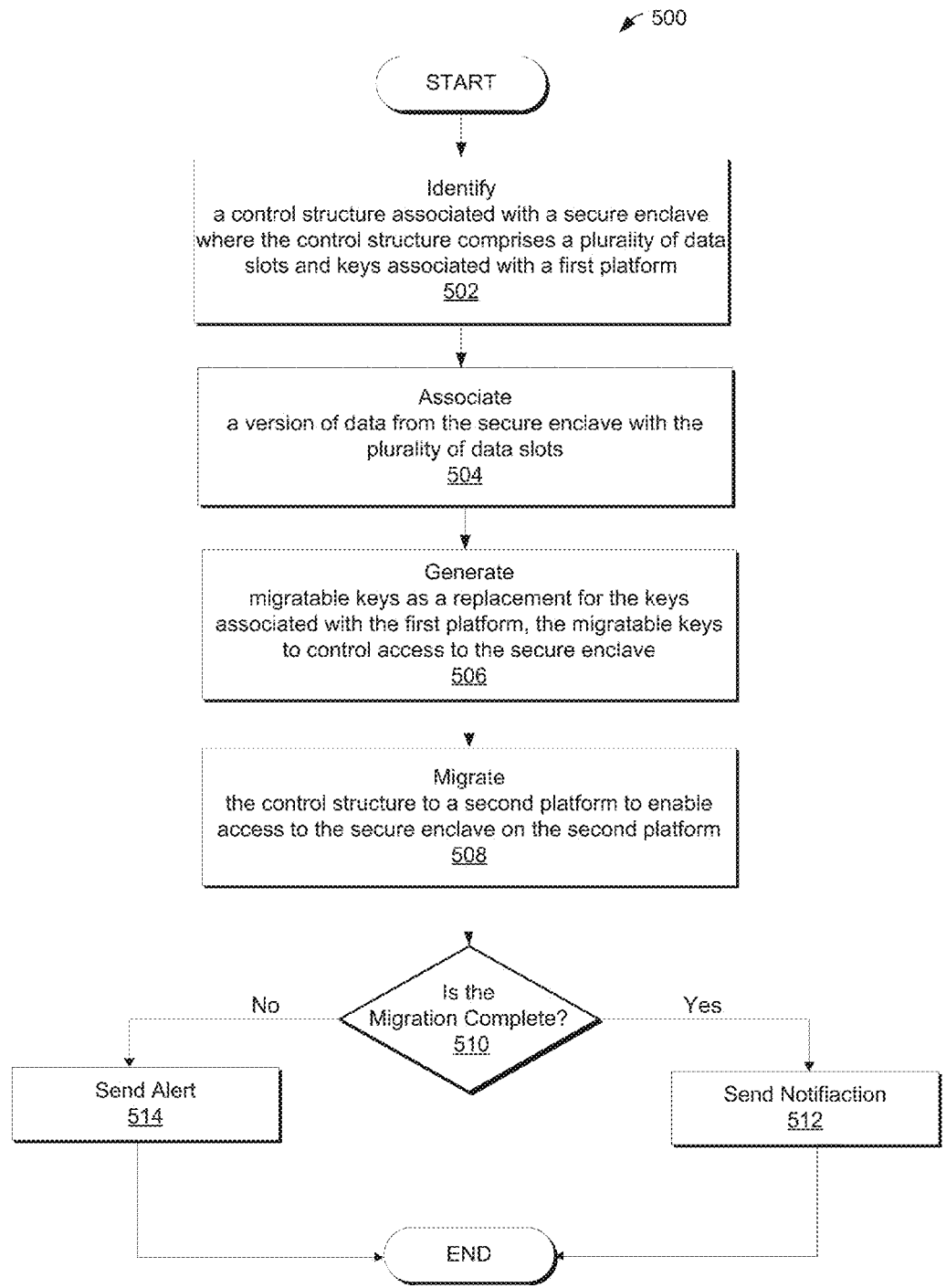
FIG. 5 illustrates a flow diagram of a method to support platform migration of secure enclaves according to one embodiment.

FIG. 5 is a flow diagram illustrating a method 500 for implementing control instructions of a processing device to support platform migration of SEs according to an implementation of the disclosure. Method 500 may be performed by processing logic that may comprise hardware (e.g., circuitry, dedicated logic, programmable logic, microcode, etc.), software (such as instructions run on a processing device), firmware, or a combination thereof. In one embodiment, the cores 110 of processing device 100 of FIG. 1 may perform method 500. Although shown in a particular sequence or order, unless otherwise specified, the order of the processes can be modified. Thus, the illustrated implementations should be understood only as examples, and the illustrated processes can be performed in a different order, and some processes may be performed in parallel. Additionally, one or more processes can be omitted in various embodiments. Thus, not all processes are required in every implementation. Other process flows are possible.

Method 500 begins at block 502 where a control structure associated with a secure enclave may be identified. The control structure includes a plurality of data slots and keys associated with a first platform. At block 504, a version of data from the secure enclave may be associated with the plurality of data slots. Migratable keys that serve as a replacement for the keys associated with the first platform may be generated at block 506. The migratable keys are used to control access to the secure enclave. At block 508, the control structure may be migrated to a second platform to enable access to the secure enclave on the second platform.

Block 510 branches depending on whether the migration is complete. If the migration is successfully completed, method 500 may proceed to block 512 where a notification, for example, may be sent to a migration service on the second platform. In response, the migration service on the second platform may re-build the secure enclave on the second platform using data from the control structure, and then resume the migrated secure enclave on the second platform. If the migration terminates before completion, then method 500 may proceed to block 514. At block 514, an alert, for example, may be sent to VMM 140 on the first platform. In response, the VMM 140 may restart execution of the secure enclave on the first platform and retry migrating that enclave at a later time.

Figures 6A, 6B:
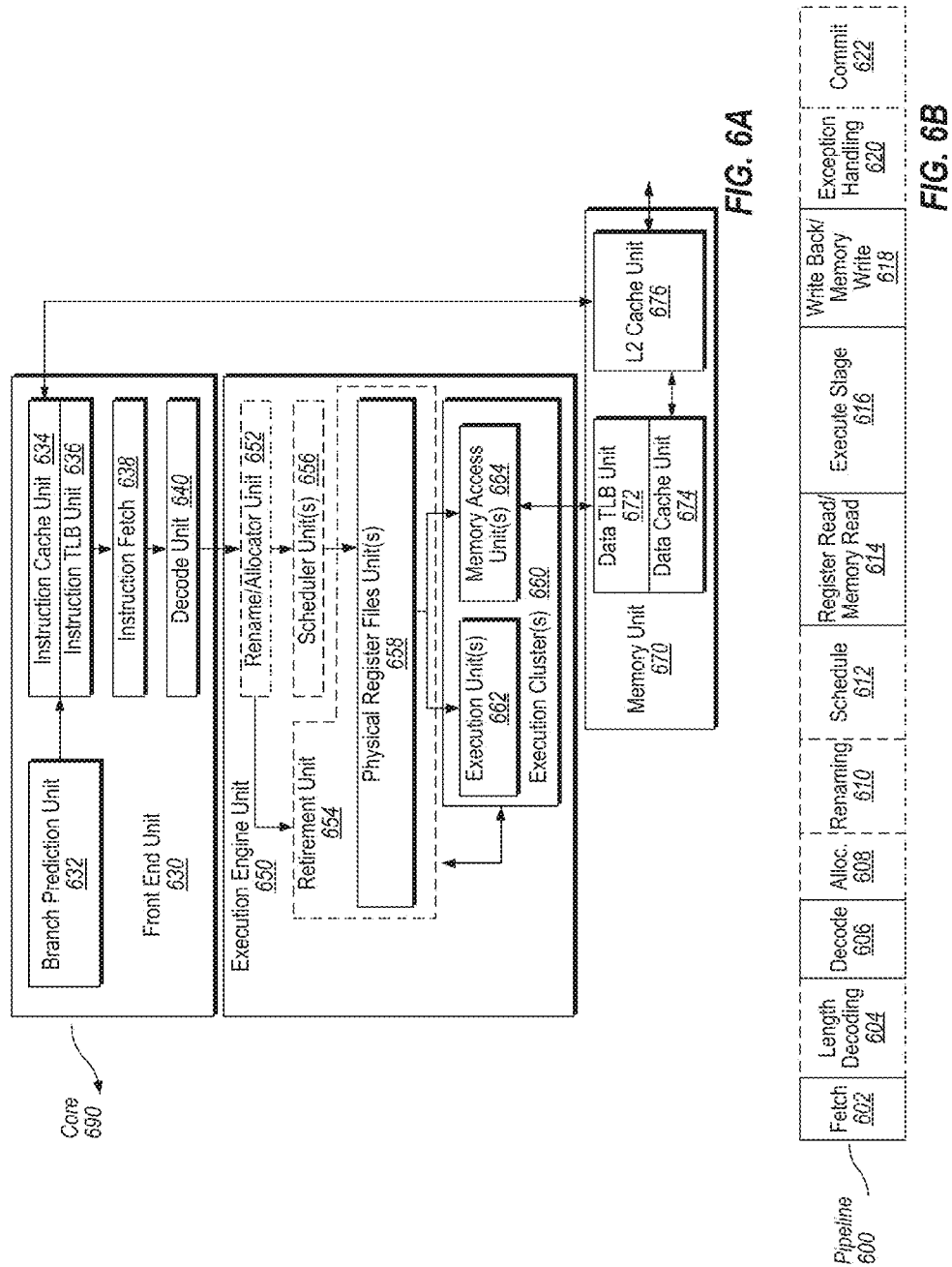
FIG. 6A is a block diagram illustrating a micro-architecture for a processor according to one embodiment.
FIG. 6B is a block diagram illustrating an in-order pipeline and a register renaming stage, out-of-order issue/execution pipeline according to one embodiment.

FIG. 6A is a block diagram illustrating a micro-architecture for a processor 600 that implements in accordance with one embodiment of the disclosure. Specifically, processor 600 depicts an in-order architecture core and a register renaming logic, out-of-order issue/execution logic to be included in a processor according to at least one embodiment of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). The execution engine unit 650 may include for example a power management unit (PMU) 690 that governs power functions of the functional units.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

In one implementation, processor 600 may be the same as processing device 100 described with respect to FIG. 1 to support platform migration of SEs in a processing device described with respect to implementations of the disclosure.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 601 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
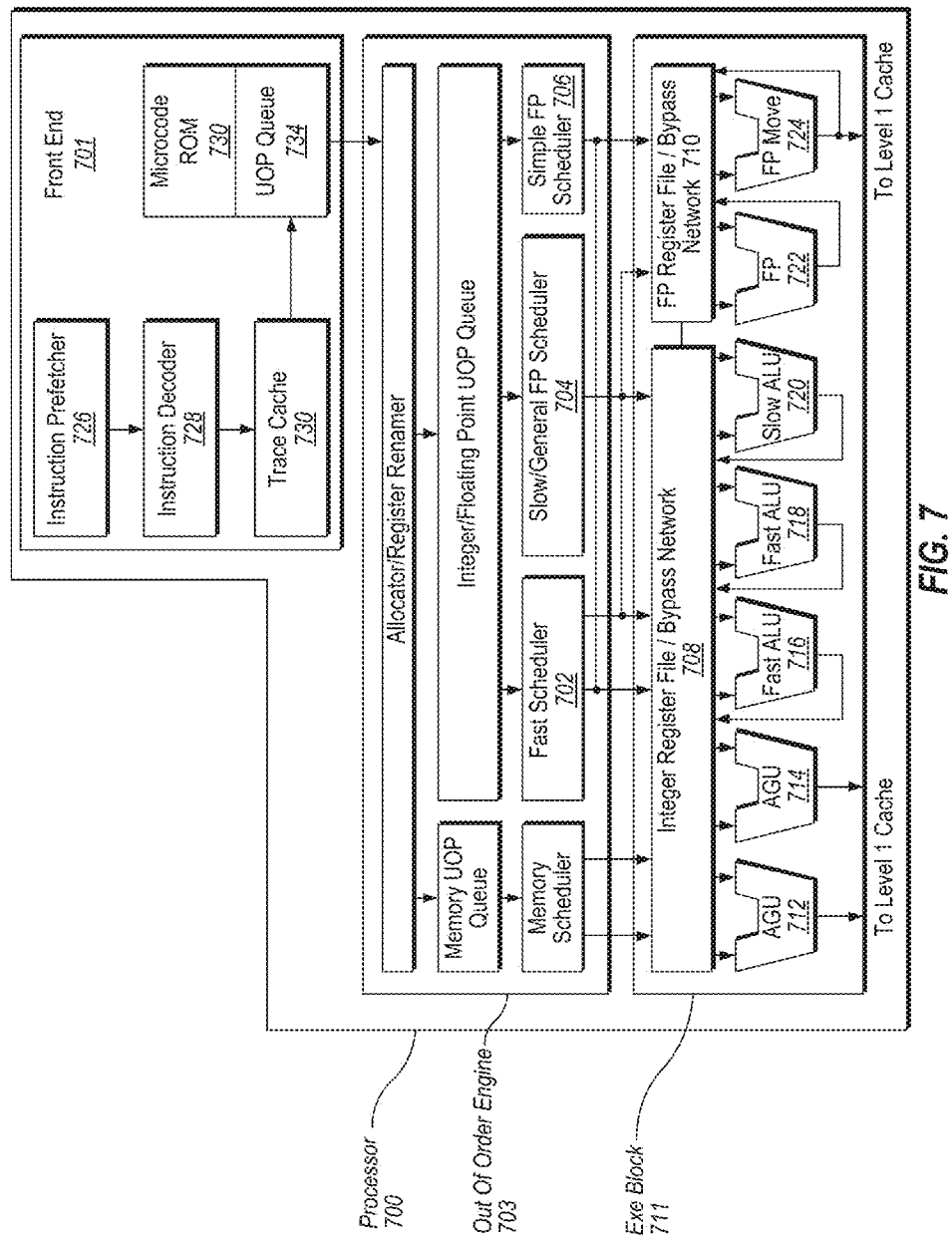
FIG. 7 is a block diagram illustrating a computer system according to one implementation.

FIG. 7 illustrates a block diagram of the micro-architecture for a processor 700 that includes logic circuits to support platform migration of SEs in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline.

The front end 701 may include several units. In one embodiment, the instruction prefetcher 726 fetches instructions from memory and feeds them to an instruction decoder 728 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 728 accesses the microcode ROM 732 to do the instruction. For one embodiment, an instruction can be decoded into a small number of micro ops for processing at the instruction decoder 728. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 720, 722, 724 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 722, floating point move unit 724. For one embodiment, the floating point execution blocks 722, 724, execute floating point, MMX, SIMD, and SSE, or other operations. The floating point ALU 722 of one embodiment includes a 64 bit by 64 bit floating point divider to execute divide, square root, and remainder micro-ops. For embodiments of the disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 712, 714. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating point units 722, 724, can be implemented to support a range of operands having bits of various widths. For one embodiment, the floating point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement store address prediction for memory disambiguation according to embodiments of the disclosure. In one embodiment, the execution block 711 of processor 700 may include a store address predictor (not shown) for supporting platform migration of SEs.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
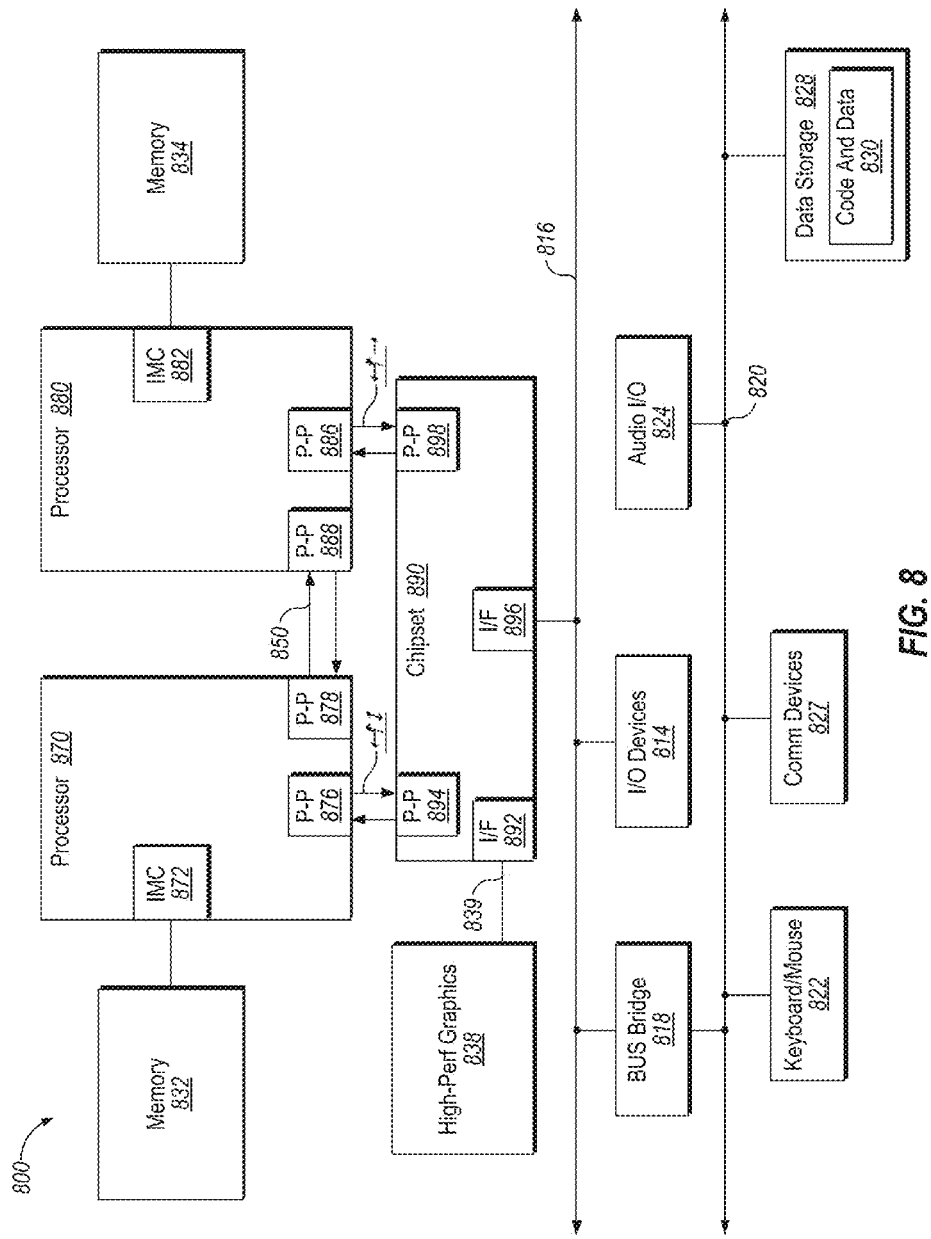
FIG. 8 is a block diagram illustrating a system in which an embodiment of the disclosure may be used.

Embodiments may be implemented in many different system types. Referring now to FIG. 8, shown is a block diagram illustrating a system 800 in which an embodiment of the disclosure may be used. As shown in FIG. 8, multiprocessor system 800 is a point-to-point interconnect system, and includes a first processor 870 and a second processor 880 coupled via a point-to-point interconnect 850. While shown with only two processors 870, 880, it is to be understood that the scope of embodiments of the disclosure is not so limited. In other embodiments, one or more additional processors may be present in a given processor. In one embodiment, the multiprocessor system 800 may support platform migration of SEs as described herein.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the disclosure is not so limited.

As shown in FIG. 8, various I/O devices 814 may be coupled to first bus 816, along with a bus bridge 818, which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device, which may include instructions/code and data 830, in one embodiment. Further, an audio I/O 824 may be coupled to second bus 820. Note that other architectures are possible. For example, instead of the point-to-point architecture of FIG. 8, a system may implement a multi-drop bus or other such architecture.

Figure 9:
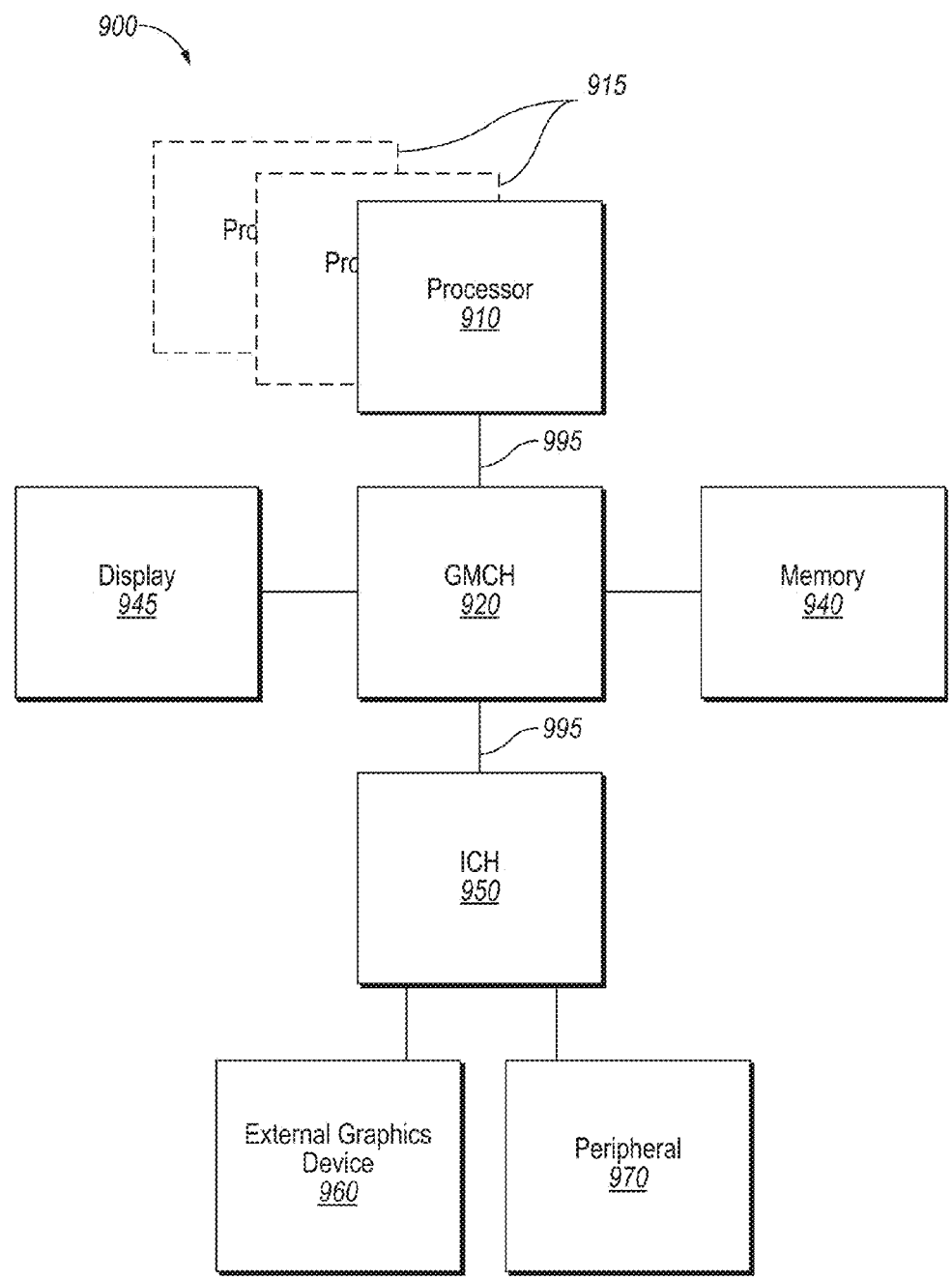
FIG. 9 is a block diagram illustrating a system in which an embodiment of the disclosure may be used.

Referring now to FIG. 9, shown is a block diagram of a system 900 in which one embodiment of the disclosure may operate. The system 900 may include one or more processors 910, 915, which are coupled to graphics memory controller hub (GMCH) 920. The optional nature of additional processors 915 is denoted in FIG. 9 with broken lines. In one embodiment, processors 910, 915 support platform migration of SEs according to embodiments of the disclosure.

Each processor 910, 915 may be some version of the circuit, integrated circuit, processor, and/or silicon integrated circuit as described above. However, it should be noted that it is unlikely that integrated graphics logic and integrated memory control units would exist in the processors 910, 915. FIG. 9 illustrates that the GMCH 920 may be coupled to a memory 940 that may be, for example, a dynamic random access memory (DRAM). The DRAM may, for at least one embodiment, be associated with a non-volatile cache.

The GMCH 920 may be a chipset, or a portion of a chipset. The GMCH 920 may communicate with the processor(s) 910, 915 and control interaction between the processor(s) 910, 915 and memory 940. The GMCH 920 may also act as an accelerated bus interface between the processor(s) 910, 915 and other elements of the system 900. For at least one embodiment, the GMCH 920 communicates with the processor(s) 910, 915 via a multi-drop bus, such as a frontside bus (FSB) 995.

Furthermore, GMCH 920 is coupled to a display 945 (such as a flat panel or touchscreen display). GMCH 920 may include an integrated graphics accelerator. GMCH 920 is further coupled to an input/output (I/O) controller hub (ICH) 950, which may be used to couple various peripheral devices to system 900. Shown for example in the embodiment of FIG. 9 is an external graphics device 960, which may be a discrete graphics device, coupled to ICH 950, along with another peripheral device 970.

Alternatively, additional or different processors may also be present in the system 900. For example, additional processor(s) 915 may include additional processors(s) that are the same as processor 910, additional processor(s) that are heterogeneous or asymmetric to processor 910, accelerators (such as, e.g., graphics accelerators or digital signal processing (DSP) units), field programmable gate arrays, or any other processor. There can be a variety of differences between the processor(s) 910, 915 in terms of a spectrum of metrics of merit including architectural, micro-architectural, thermal, power consumption characteristics, and the like. These differences may effectively manifest themselves as asymmetry and heterogeneity amongst the processors 910, 915. For at least one embodiment, the various processors 910, 915 may reside in the same die package.

Figure 10:
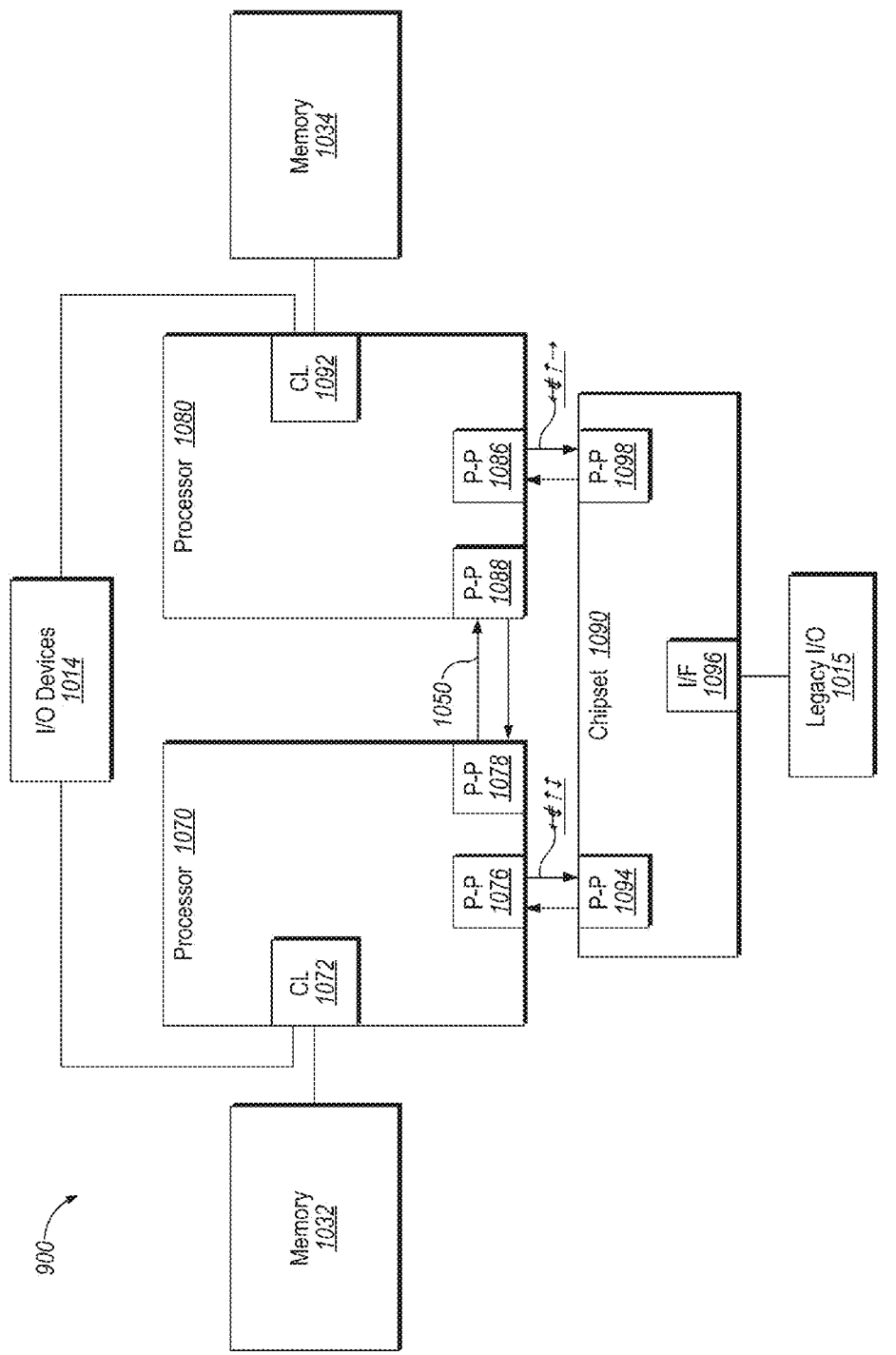
FIG. 10 is a block diagram illustrating a system in which an embodiment of the disclosure may be used.

Referring now to FIG. 10, shown is a block diagram of a system 1000 in which an embodiment of the disclosure may operate. FIG. 10 illustrates processors 1070, 1080. In one embodiment, processors 1070, 1080 may support platform migration of SEs as described above. Processors 1070, 1080 may include integrated memory and I/O control logic ("CL") 1072 and 1082, respectively and intercommunicate with each other via point-to-point interconnect 1050 between point-to-point (P-P) interfaces 1078 and 1088 respectively. Processors 1070, 1080 each communicate with chipset 1090 via point-to-point interconnects 1052 and 1054 through the respective P-P interfaces 1076 to 1094 and 1086 to 1098 as shown. For at least one embodiment, the CL 1072, 1082 may include integrated memory controller units. CLs 1072, 1082 may include I/O control logic. As depicted, memories 1032, 1034 coupled to CLs 1072, 1082 and I/O devices 1014 are also coupled to the control logic 1072, 1082. Legacy I/O devices 1015 are coupled to the chipset 1090 via interface 1096.

Figure 11:
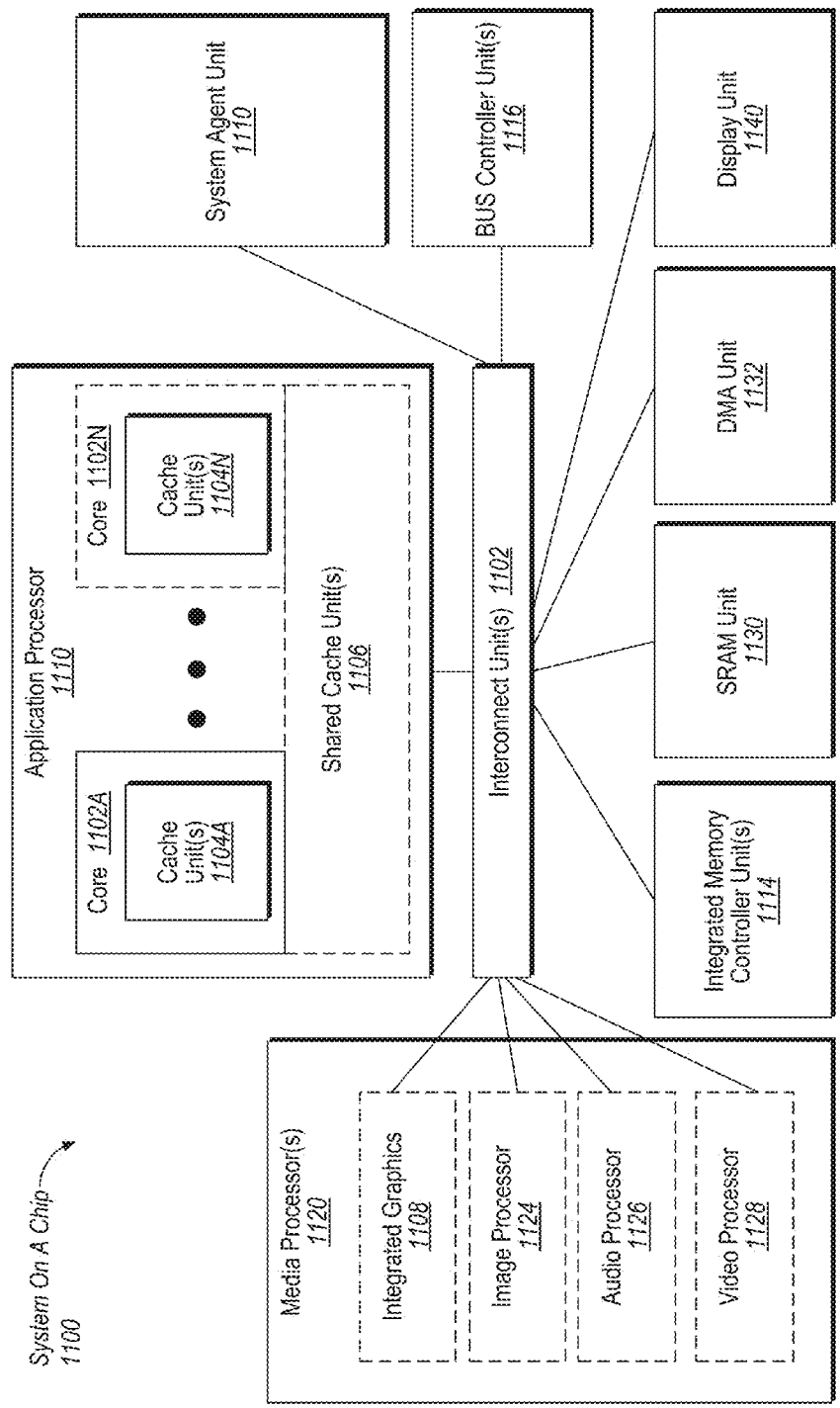
FIG. 11 is a block diagram illustrating a System-on-a-Chip (SoC) in which an embodiment of the disclosure may be used.

Embodiments may be implemented in many different system types. FIG. 11 is a block diagram of a SoC 1100 in accordance with an embodiment of the disclosure. Dashed lined boxes are optional features on more advanced SoCs. In FIG. 11, an interconnect unit(s) 1112 is coupled to: an application processor 1120 which includes a set of one or more cores 1102A-N and shared cache unit(s) 1106; a system agent unit 1110; a bus controller unit(s) 1116; an integrated memory controller unit(s) 1114; a set or one or more media processors 1118 which may include integrated graphics logic 1108, an image processor 1124 for providing still and/or video camera functionality, an audio processor 1126 for providing hardware audio acceleration, and a video processor 1128 for providing video encode/decode acceleration; an static random access memory (SRAM) unit 1130; a direct memory access (DMA) unit 1132; and a display unit 1140 for coupling to one or more external displays. In one embodiment, a memory module may be included in the integrated memory controller unit(s) 1114. In another embodiment, the memory module may be included in one or more other components of the SoC 1100 that may be used to access and/or control a memory. The application processor 1120 may include a PMU for implementing silent memory instructions and miss-rate tracking to optimize switching policy on threads as described in embodiments herein.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture and/or instruction set. For example, some of the cores 1102A-N may be in order while others are out-of-order. As another example, two or more of the cores 1102A-N may be capable of execution the same instruction set, while others may be capable of executing only a subset of that instruction set or a different instruction set.

The application processor 1120 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1120 may be from another company, such as ARM Holdings™, Ltd, MIPS™, etc. The application processor 1120 may be a special-purpose processor, such as, for example, a network or communication processor, compression engine, graphics processor, co-processor, embedded processor, or the like. The application processor 1120 may be implemented on one or more chips. The application processor 1120 may be a part of and/or may be implemented on one or more substrates using any of a number of process technologies, such as, for example, BiCMOS, CMOS, or NMOS.

Figure 12:
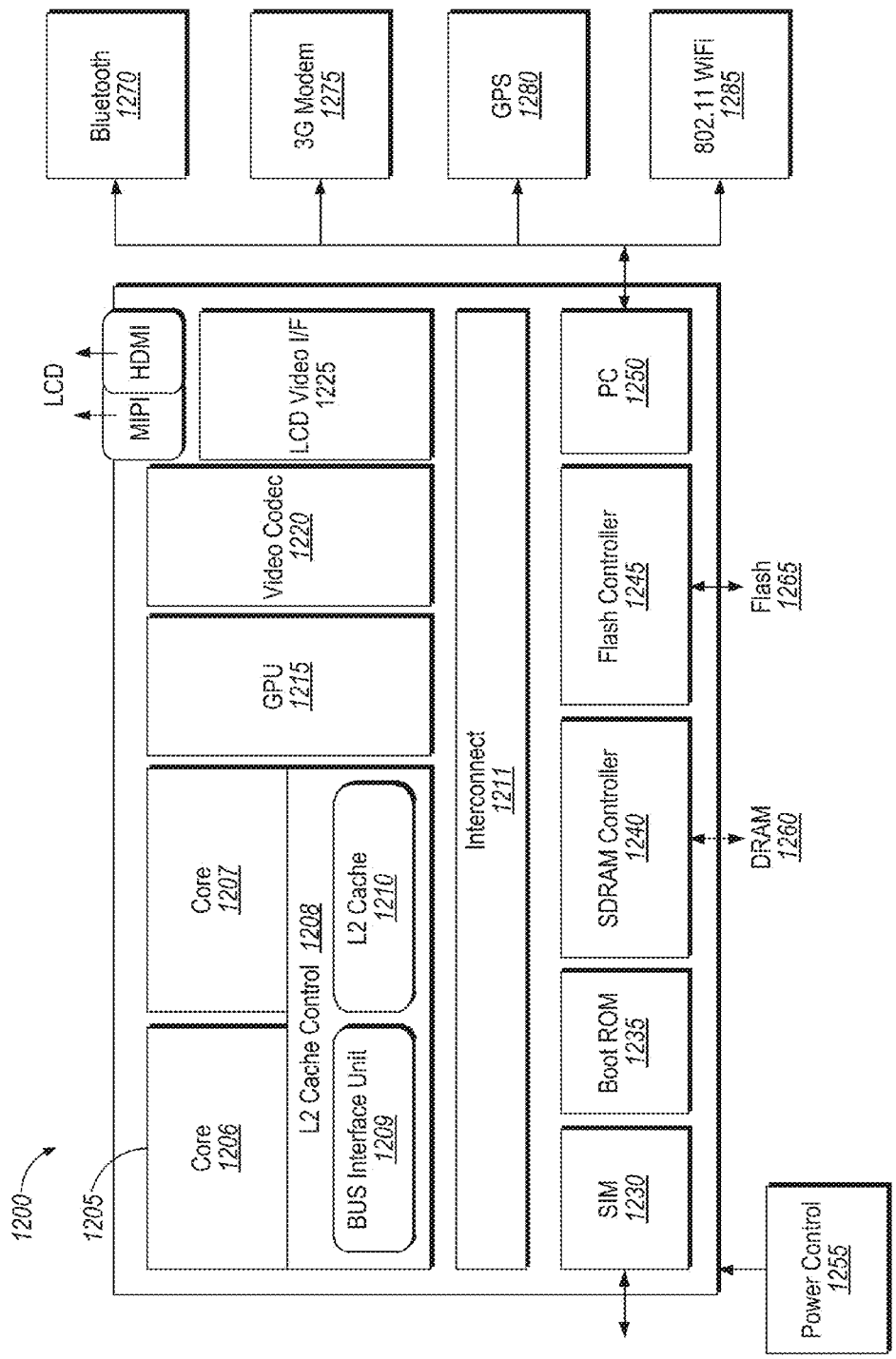
FIG. 12 is a block diagram illustrating a SoC design in which an embodiment of the disclosure may be used.

FIG. 12 is a block diagram of an embodiment of a system on-chip (SoC) design in accordance with the disclosure. As a specific illustrative example, SoC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1210 includes an on-chip interconnect, such as an IOSF, AMBA, or other interconnect discussed above, which potentially implements one or more aspects of the described disclosure. In one embodiment, cores 1206, 1207 may support platform migration of SEs described in embodiments herein.

Interconnect 1210 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the disclosure described herein. In addition, the system 1200 illustrates peripherals for communication, such as a Bluetooth module 1270, 3G modem 1275, GPS 1280, and Wi-Fi 1185.

Figure 13:
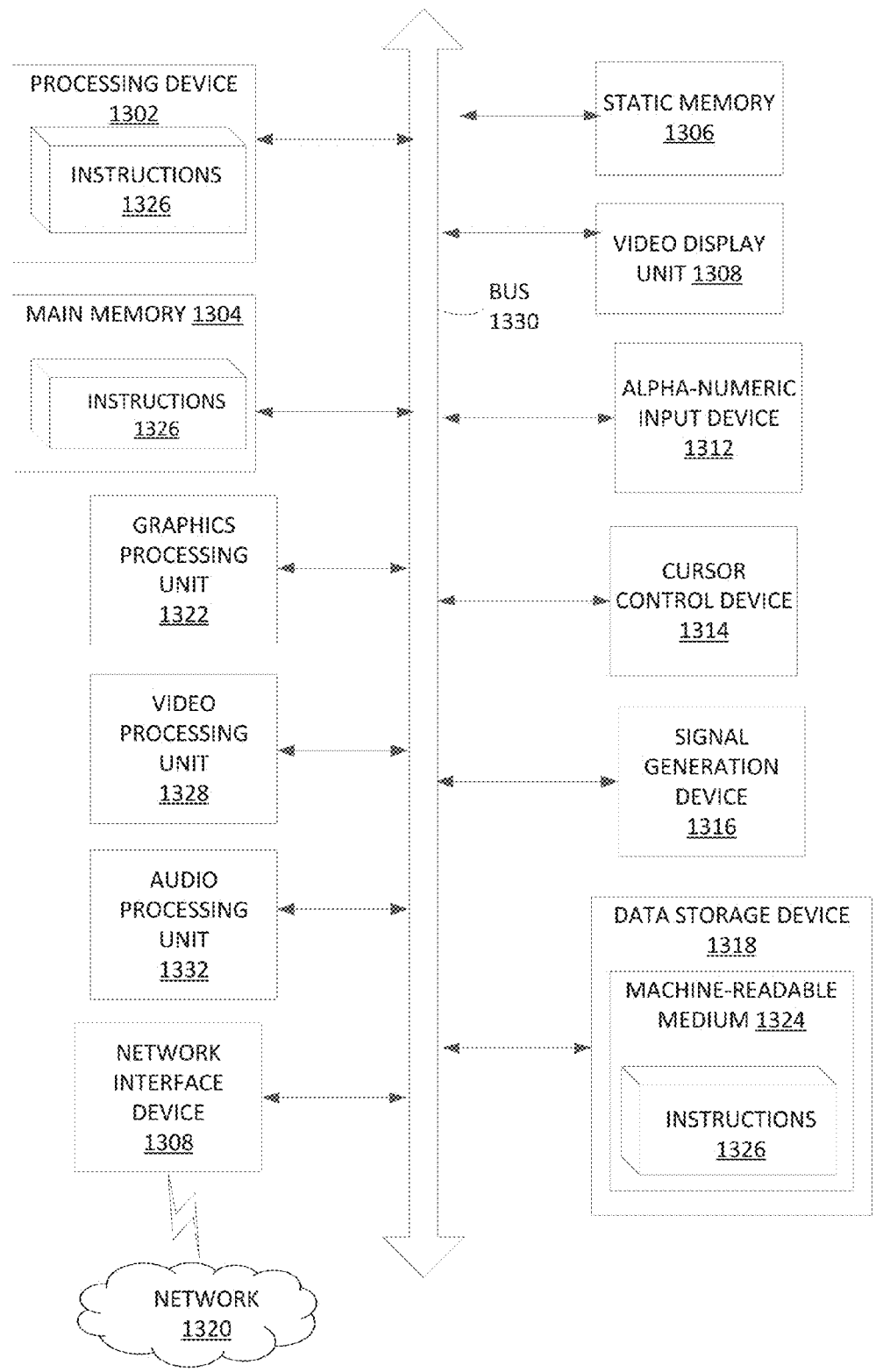
FIG. 13 illustrates a block diagram illustrating a computer system in which an embodiment of the disclosure may be used.

FIG. 13 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1300 includes a processing device 1302, a main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1302 may also be one or more special-purpose processing devices such as an application specific integrated circuit (ASIC), a field programmable gate array (FPGA), a digital signal processor (DSP), network processor, or the like. In one embodiment, processing device 1302 may include one or processing cores. The processing device 1302 is configured to execute the processing logic 1326 for performing the operations and steps discussed herein. In one embodiment, processing device 1302 is the same as processor architecture 100 described with respect to FIG. 1 that implements platform migration of SEs as described herein with embodiments of the disclosure.

The computer system 1300 may further include a network interface device 1308 communicably coupled to a network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), and a signal generation device 1316 (e.g., a speaker). Furthermore, computer system 1300 may include a graphics processing unit 1322, a video processing unit 1328, and an audio processing unit 1332.

The data storage device 1318 may include a non-transitory machine-accessible storage medium 1324 on which is stored software 1326 implementing any one or more of the methodologies of functions described herein, such as implementing silent memory instructions and miss-rate tracking to optimize switching policy on threads in a processing device as described above. The software 1326 may also reside, completely or at least partially, within the main memory 1304 as instructions 1326 and/or within the processing device 1302 as processing logic 1326 during execution thereof by the computer system 1300; the main memory 1304 and the processing device 1302 also constituting machine-accessible storage media.

The non-transitory machine-readable storage medium 1324 may also be used to store instructions 1326 implementing silent memory instructions and miss-rate tracking to optimize switching policy on threads in a processing device such as described with respect to processing device 100 in FIG. 1, and/or a software library containing methods that call the above applications. While the non-transitory machine-accessible storage medium 1324 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

The following examples pertain to further embodiments.

Example 1 is a processor comprising: 1) a memory controller unit to access secure enclaves and a processor core coupled to the memory controller unit. The processor core is to: a) identify a control structure associated with a secure enclave, the control structure comprises a plurality of data slots and keys associated with a first platform comprising the memory controller unit and the processor core; b) associate a version of data from the secure enclave with the plurality of data slots; c) generate migratable keys as a replacement for the keys associated with the control structure, the migratable keys to control access to the secure enclave; and d) migrate the control structure to a second platform to enable access to the secure enclave on the second platform.

In Example 2, the subject matter of Example 1, where the processor core further to seal the control structure to prevent updates to content in the plurality of data slots.

In Example 3, the subject matter of any one of Examples 1-2, wherein the processor core further to unseal the control structure to read content in the plurality of data slots.

In Example 4, the subject matter of any one of Examples 1-3, wherein to migrate the control structure further comprises the processor core to securely transmit the control structure from the first platform to the second platform.

In Example 5, the subject matter of any one of Examples 1-4, wherein to migrate the control structure further comprises the processor core to: 1) securely transmit the control structure a trusted server, and 2) cause the trusted server to transmit the control structure to the second platform.

In Example 6, the subject matter of any one of Examples 1-5, wherein responsive to detecting that migration of the control structure is complete, the processor core is further to generate a notification indicator.

In Example 7, the subject matter of any one of Examples 1-6, wherein the processor core is further to suspend execution of the virtual machine associated with the secure enclave.

In Example 8, the subject matter of any one of Examples 1-7, wherein responsive to suspending execution of the virtual machine, the processor core is further to: 1) evict memory pages associated with the secure enclave from memory; and 2) associate version data of the evicted memory pages with the plurality of data slots associated with the control structure.

Various embodiments may have different combinations of the structural features described above. For instance, all optional features of the processor described above may also be implemented with respect to a method or process described herein and specifics in the examples may be used anywhere in one or more embodiments.

Example 9 is a method comprising: a) identifying, by a processing device, a control structure associated with a secure enclave, the control structure comprises a plurality of data slots and keys associated with a first platform comprising the memory controller unit and the processor core; b) associating a version of data from the secure enclave with the plurality of data slots; c) generating, using the processing device, migratable keys as a replacement for the keys associated with the control structure, the migratable keys to control access to the secure enclave; and d) migrating, using the processing device, the control structure to a second platform to enable access to the secure enclave on the second platform.

In Example 10, the subject matter of Example 9, further comprising sealing the control structure for preventing updates to content in the plurality of data slots.

In Example 11, the subject matter of any one of Example 9-10, further comprising unsealing the control structure for reading content in the plurality of data slots.

In Example 12, the subject matter of any one of Example 9-11, wherein migrating the control structure further comprises securely transmitting the control structure from the first platform to the second platform.

In Example 13, the subject matter of any one of Example 9-12, wherein migrating the control structure further comprises: 1) securely transmitting the control structure a trusted server, and 2) causing the trusted server to transmit the control structure to the second platform.

In Example 14, the subject matter of any one of Example 9-13, wherein responsive to detecting that migration of the control structure is complete, generating a notification indicator.

In Example 15, the subject matter of any one of Example 9-14, further comprising suspending execution of the virtual machine associated with the secure enclave.

In Example 16, the subject matter of any one of Example 9-15, further comprising responsive to suspending execution of the virtual machine: 1) evicting memory pages associated with the secure enclave from memory; and 2) associating version data of the evicted memory pages with the plurality of data slots associated with the control structure.

Various embodiments may have different combinations of the operational features described above. For instance, all optional features of the methods described above may also be implemented with respect to a non-transitory, computer-readable storage medium. Specifics in the examples may be used anywhere in one or more embodiments.

Example 17 is a non-transitory, computer-readable storage medium including instructions that when executed by a processing device, cause the processing device to: a) identify, using the processing device, a control structure associated with a secure enclave, the control structure comprises a plurality of data slots and keys associated with a first platform comprising the memory controller unit and the processor core; b) associate a version of data from the secure enclave with the plurality of data slots; c) generate migratable keys as a replacement for the keys associated with the control structure, the migratable keys to control access to the secure enclave; and d) migrate the control structure to a second platform to enable access to the secure enclave on the second platform.

In Example 18, the subject matter of any one of Examples 17, wherein the executable instructions further cause the processing device to seal the control structure for preventing updates to content in the plurality of data slots.

In Example 19, the subject matter of any one of Examples 17-18, wherein the executable instructions further cause the processing device to unseal the control structure for reading content in the plurality of data slots.

In Example 20, the subject matter of any one of Examples 17-19, wherein to migrate the control structure, the executable instructions further cause the processing device to securely transmit the control structure from the first platform to the second platform.

In Example 21, the subject matter of any one of Examples 17-20, wherein to migrate the control structure, the executable instructions further cause the processing device to: 1) securely transmit the control structure a trusted server, and 2) cause the trusted server to transmit the control structure to the second platform.

In Example 22, the subject matter of any one of Examples 17-21, wherein responsive to detecting that migration of the control structure is complete, the executable instructions further cause the processing device to generate a notification indicator.

In Example 23, the subject matter of any one of Examples 17-22, wherein the executable instructions further cause the processing device to suspend execution of the virtual machine associated with the secure enclave.

In Example 24, the subject matter of any one of Examples 17-23, wherein responsive to suspending execution of the virtual machine, the executable instructions further cause the processing device to: 1) evict memory pages associated with the secure enclave from memory; and 2) associate version data for the evicted memory pages with the plurality of data slots associated with the control structure.

Example 25 is a non-transitory, computer-readable storage medium including instructions that, when executed by a processor, cause the processor to perform the method of Examples 9-16.

Various embodiments may have different combinations of the operational features described above.

Example 26 is a system comprising a system on chip (SoC) comprising a plurality of functional units and a memory controller unit (MCU) coupled to the plurality of functional units, wherein the MCU comprises a processor, wherein the processor is configured to perform the method of examples 9-16.

In Example 27, the subject matter of Example 26, wherein the SoC further comprises the subject matter of any of the examples 1-8 and 17-24.

Example 28 is an apparatus comprising: 1) a plurality of functional units of a processor; 2) means for identifying, by the processor, a control structure associated with a secure enclave, the control structure comprises a plurality of data slots and keys associated with a first platform comprising the memory controller unit and the processor; 3) means for associating a version of data from the secure enclave with the plurality of data slots; 4) means for generating migratable keys as a replacement for the keys associated with the control structure, the migratable keys to control access to the secure enclave; and 5) means migrating the control structure to a second platform to enable access to the secure enclave on the second platform.

In Example 29, the subject matter of Example 28, further comprising the subject matter of any of claims 1-8 and 17-24.

Example 30 is a system comprising: a memory device and a processor comprising a memory controller unit, wherein the processor is configured to perform the method of any of examples 9-16.

In Example 31, the subject matter of Example 30, further comprising the subject matter of any of examples 1-8 and 17-24.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
a memory controller unit to access secure enclaves; and
a processor core coupled to the memory controller unit, the processor core to:
identify a control structure associated with a secure enclave, the control structure comprises a plurality of data slots and keys associated with a first platform comprising the memory controller unit and the processor core;
associate a version of data from the secure enclave with the plurality of data slots;
generate migratable keys as a replacement for the keys associated with the control structure, the migratable keys to control access to the secure enclave; and
migrate the control structure to a second platform to enable access to the secure enclave on the second platform.

2. The processor of claim 1, wherein the processor core further to seal the control structure to prevent updates to content in the plurality of data slots.

3. The processor of claim 1, wherein the processor core further to unseal the control structure to read content in the plurality of data slots.

4. The processor of claim 1, wherein to migrate the control structure further comprises the processor core to securely transmit the control structure from the first platform to the second platform.

5. The processor of claim 1, wherein to migrate the control structure further comprises the processor core to:
securely transmit the control structure a trusted server, and
cause the trusted server to transmit the control structure to the second platform.

6. The processor of claim 1, wherein responsive to detecting that migration of the control structure is complete, the processor core is further to generate a notification indicator.

7. The processor of claim 1, wherein the processor core is further to suspend execution of a virtual machine associated with the secure enclave.

8. The processor of claim 7, wherein responsive to suspending execution of the virtual machine, the processor core is further to:
evict memory pages associated with the secure enclave from memory; and
associate version data of the evicted memory pages with the plurality of data slots associated with the control structure.

9. A method, comprising:
identifying, by a processing device, a control structure associated with a secure enclave, the control structure comprises a plurality of data slots and keys associated with a first platform comprising the memory controller unit and the processor core;
associating a version of data from the secure enclave with the plurality of data slots;
generating, using the processing device, migratable keys as a replacement for the keys associated with the control structure, the migratable keys to control access to the secure enclave; and
migrating, using the processing device, the control structure to a second platform to enable access to the secure enclave on the second platform.

10. The method of claim 9, further comprising sealing the control structure for preventing updates to content in the plurality of data slots.

11. The method of claim 9, further comprising unsealing the control structure for reading content in the plurality of data slots.

12. The method of claim 9, wherein migrating the control structure further comprises securely transmitting the control structure from the first platform to the second platform.

13. The method of claim 9, wherein migrating the control structure further comprises:
securely transmitting the control structure a trusted server, and
causing the trusted server to transmit the control structure to the second platform.

14. The method of claim 9, wherein responsive to detecting that migration of the control structure is complete, generating a notification indicator.

15. The method of claim 9, further comprising suspending execution of a virtual machine associated with the secure enclave.

16. The method of claim 15, further comprising responsive to suspending execution of the virtual machine:
evicting memory pages associated with the secure enclave from memory; and
associating version data of the evicted memory pages with the plurality of data slots associated with the control structure.

17. A computer-readable non-transitory storage medium comprising executable instructions that, when executed by a processing device, cause the processing device to:
identify, using the processing device, a control structure associated with a secure enclave, the control structure comprises a plurality of data slots and keys associated with a first platform comprising the memory controller unit and the processor core;
associate a version of data from the secure enclave with the plurality of data slots;
generate migratable keys as a replacement for the keys associated with the control structure, the migratable keys to control access to the secure enclave; and
migrate the control structure to a second platform to enable access to the secure enclave on the second platform.

18. The computer-readable non-transitory storage medium of claim 17, wherein the executable instructions further cause the processing device to seal the control structure for preventing updates to content in the plurality of data slots.

19. The computer-readable non-transitory storage medium of claim 17, wherein the executable instructions further cause the processing device to unseal the control structure for reading content in the plurality of data slots.

20. The computer-readable non-transitory storage medium of claim 17, wherein to migrate the control structure, the executable instructions further cause the processing device to securely transmit the control structure from the first platform to the second platform.

* * * * *